United States Patent
Chavez, Jr.

(10) Patent No.: US 6,298,240 B1
(45) Date of Patent: Oct. 2, 2001

(54) TERMINATING EXTENSION GROUPS CONTROLLED BY WIRELESS TERMINALS

(75) Inventor: David L. Chavez, Jr., Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/182,338

(22) Filed: Oct. 29, 1998

(51) Int. Cl.$^7$ .............................. H04B 7/00; H04Q 7/20
(52) U.S. Cl. .................. 455/519; 455/456; 455/518; 455/417
(58) Field of Search .................... 455/417, 463, 455/458, 456, 414, 525, 519, 518

(56) References Cited

U.S. PATENT DOCUMENTS

| | | | | |
|---|---|---|---|---|
| 4,436,962 | * | 3/1984 | Davis et al. ................ | 179/18.6 B |
| 4,875,038 | * | 10/1989 | Siwiak et al. ............... | 340/825.44 |
| 5,206,901 | * | 4/1993 | Harlow et al. ............... | 379/211 |
| 5,371,781 | * | 12/1994 | Ardon et al. ................ | 379/59 |
| 5,711,007 | * | 1/1998 | Lin et al. ................... | 455/447 |
| 5,745,561 | * | 4/1998 | Baker et al. ................ | 379/210 |
| 5,862,482 | * | 1/1999 | Beesley ..................... | 455/434 |
| 5,924,041 | * | 7/1999 | Alperovich et al. ......... | 455/456 |
| 5,926,760 | * | 7/1999 | Khan et al. ................ | 455/435 |
| 6,009,333 | * | 12/1999 | Chaco . | |
| 6,055,434 | * | 4/2000 | Seraj ....................... | 455/456 |
| 6,101,396 | * | 8/2000 | Chavez, Jr. ................ | 455/519 |
| 6,192,234 | * | 2/2001 | Chavez, Jr. ................ | 455/414 |
| 6,195,560 | * | 2/2001 | Chavez, Jr. ................ | 455/518 |
| 6,198,938 | * | 3/2001 | Chavez, Jr. ................ | 455/519 |

* cited by examiner

*Primary Examiner*—William Trost
*Assistant Examiner*—Marceau Milford
(74) *Attorney, Agent, or Firm*—John C. Moran

(57) ABSTRACT

A wireless terminal dynamically positions itself into a terminating ring group based on the location of the wireless terminal. Similarly, a wireless terminal dynamically removes itself from a terminating ring group on the basis of the location of the wireless terminal. A wireless terminal can be excluded from joining a terminating ring group in a specific location. The wireless terminal positions itself into the terminating ring group by communicating information with other wireless terminals already in the terminating ring group. This communication is controlled by a controlling wireless terminal with which the wireless terminal first communicates upon entering the location. The wireless terminal determines its position by communication with a fixed unit assigned to the location of terminating ring group. Upon determining that it is leaving the location, the wireless terminal transmits a message to controlling wireless terminal to inform it of this fact. In turn, the controlling wireless terminal transmits messages to the other wireless terminals to inform them of the departure of the wireless terminal.

18 Claims, 11 Drawing Sheets

| TABLE 1 FOR WIRELESS TERMINAL 106 | | | | | |
|---|---|---|---|---|---|
| FIXED UNIT OR WIRELESS TER. | TELEPHONE NUMBER | UNIT | EXCLUDED FIXED UNIT | CONTROLLING WIRELESS TER. | PRESENT LOCATION |
| 115 | 2903 | | | | 1 |
| 116 | 2904 | | | | |
| 117 | 2902 | | 1 | | |
| 104 | 2804 | | | | |
| 105 | 2805 | | | | |
| 106 | 2806 | 1 | | 1 | |
| | | | | | |
| 201 | 202 | 203 | 204 | 205 | 206 |

*FIG. 2*

| TABLE 1 FOR WIRELESS TERMINAL 106 | | | | | |
|---|---|---|---|---|---|
| FIXED UNIT OR WIRELESS TER. | TELEPHONE NUMBER | UNIT | EXCLUDED FIXED UNIT | CONTROLLING WIRELESS TER. | PRESENT LOCATION |
| 115 | 2903 | | | | |
| 116 | 2904 | | | | 1 |
| 117 | 2902 | | 1 | | |
| 108 | 2808 | | | | |
| 109 | 2809 | | | 1 | |
| 106 | 2806 | 1 | | | |
| | | | | | |
| 301 | 302 | 303 | 304 | 305 | 306 |

*FIG. 3*

| TABLE 1 FOR WIRELESS TERMINAL 104 | | | | | |
|---|---|---|---|---|---|
| FIXED UNIT OR WIRELESS TER. | TELEPHONE NUMBER | UNIT | EXCLUDED FIXED UNIT | CONTROLLING WIRELESS TER. | PRESENT LOCATION |
| 115 | 2903 | | | | 1 |
| 116 | 2904 | | | | |
| 117 | 2902 | | 1 | | |
| 104 | 2804 | 1 | | | |
| 105 | 2805 | | | | |
| 106 | 2806 | | | 1 | |
| | | | | | |
| 401 | 402 | 403 | 404 | 405 | 406 |

*FIG. 4*

| TABLE 1 FOR WIRELESS TERMINAL 104 | | | | | |
|---|---|---|---|---|---|
| FIXED UNIT OR WIRELESS TER. | TELEPHONE NUMBER | UNIT | EXCLUDED FIXED UNIT | CONTROLLING WIRELESS TER. | PRESENT LOCATION |
| 115 | 2903 | | | | 1 |
| 116 | 2904 | | | | |
| 117 | 2902 | | 1 | | |
| 104 | 2804 | 1 | | | |
| 105 | 2805 | | | 1 | |
| | | | | | |
| | | | | | |
| 501 | 502 | 503 | 504 | 505 | 506 |

*FIG. 5*

| TABLE 1 FOR WIRELESS TERMINAL 108 ||||||
|---|---|---|---|---|---|
| FIXED UNIT OR WIRELESS TER. | TELEPHONE NUMBER | UNIT | EXCLUDED FIXED UNIT | CONTROLLING WIRELESS TER. | PRESENT LOCATION |
| 115 | 2903 | | | | |
| 116 | 2904 | | | | 1 |
| 117 | 2902 | | 1 | | |
| 107 | 2807 | | | | |
| 108 | 2808 | 1 | | | |
| 109 | 2809 | | | 1 | |
| | | | | | |
| 601 | 602 | 603 | 604 | 605 | 606 |

*FIG. 6*

| TABLE 1 FOR WIRELESS TERMINAL 108 ||||||
|---|---|---|---|---|---|
| FIXED UNIT OR WIRELESS TER. | TELEPHONE NUMBER | UNIT | EXCLUDED FIXED UNIT | CONTROLLING WIRELESS TER. | PRESENT LOCATION |
| 115 | 2903 | | | | |
| 116 | 2904 | | | | 1 |
| 117 | 2902 | | 1 | | |
| 107 | 2807 | | | | |
| 108 | 2808 | 1 | | | |
| 109 | 2809 | | | 1 | |
| 106 | 2806 | | | | |
| 701 | 702 | 703 | 704 | 705 | 706 |

*FIG. 7*

TERMINATING EXTENSION GROUPS CONTROLLED BY WIRELESS TERMINALS

TECHNICAL FIELD

This invention relates generally to wireless switching systems and, in particular, to telephone call management within such a system.

BACKGROUND OF THE INVENTION

In prior art business telecommunications switching systems, terminating ring groups are well known. A terminating ring group allows a group of telephones to be designated so that when one of the telephones receives an incoming call, all of the telephones in the group ring. Any of the telephones in the terminating ring group can then answer the incoming call. Upon one telephone answering the call, alerting is stopped to all of the other telephones in the terminating ring group. The prior art terminating ring groups had functioned well with wired telephone sets and wireless telephones where each wireless telephone is a second telephone set for a user. In addition, prior art terminating ring groups and their administration have functioned well for the traditional business environment where an employee is assigned a desk or a specific location and performs their principal work function at that telephone or location. The traditional environment is slowly changing. In the emerging business environment, individuals do not have a wired telephone but rather they have a wireless telephone which they carry with them at all times and which is their only telephone set. In addition, employees during the course of a day perform many functions at different locations.

SUMMARY OF THE INVENTION

The foregoing problems are solved, and a technical advance is achieved by an apparatus and method in which a wireless terminal is dynamically placed into a terminating ring group based on the location of the wireless telephone by interaction with other wireless terminals already in the terminating ring group. Similarly, a wireless terminal is dynamically removed from a terminating ring group on the basis of the location of the wireless terminal by interaction of the other wireless terminals already in the terminating ring group with each other. Advantageously, a wireless terminal can be excluded from joining a terminating ring group in a specific location.

Other and further aspects of the present invention will become apparent during the course of the following description and by reference to the accompanying drawing.

BRIEF DESCRIPTION OF THE DRAWING

FIGS. 2–7 illustrate Table 1 that is maintained by a wireless switching system in implementing the invention;

DETAILED DESCRIPTION

Figure 1:
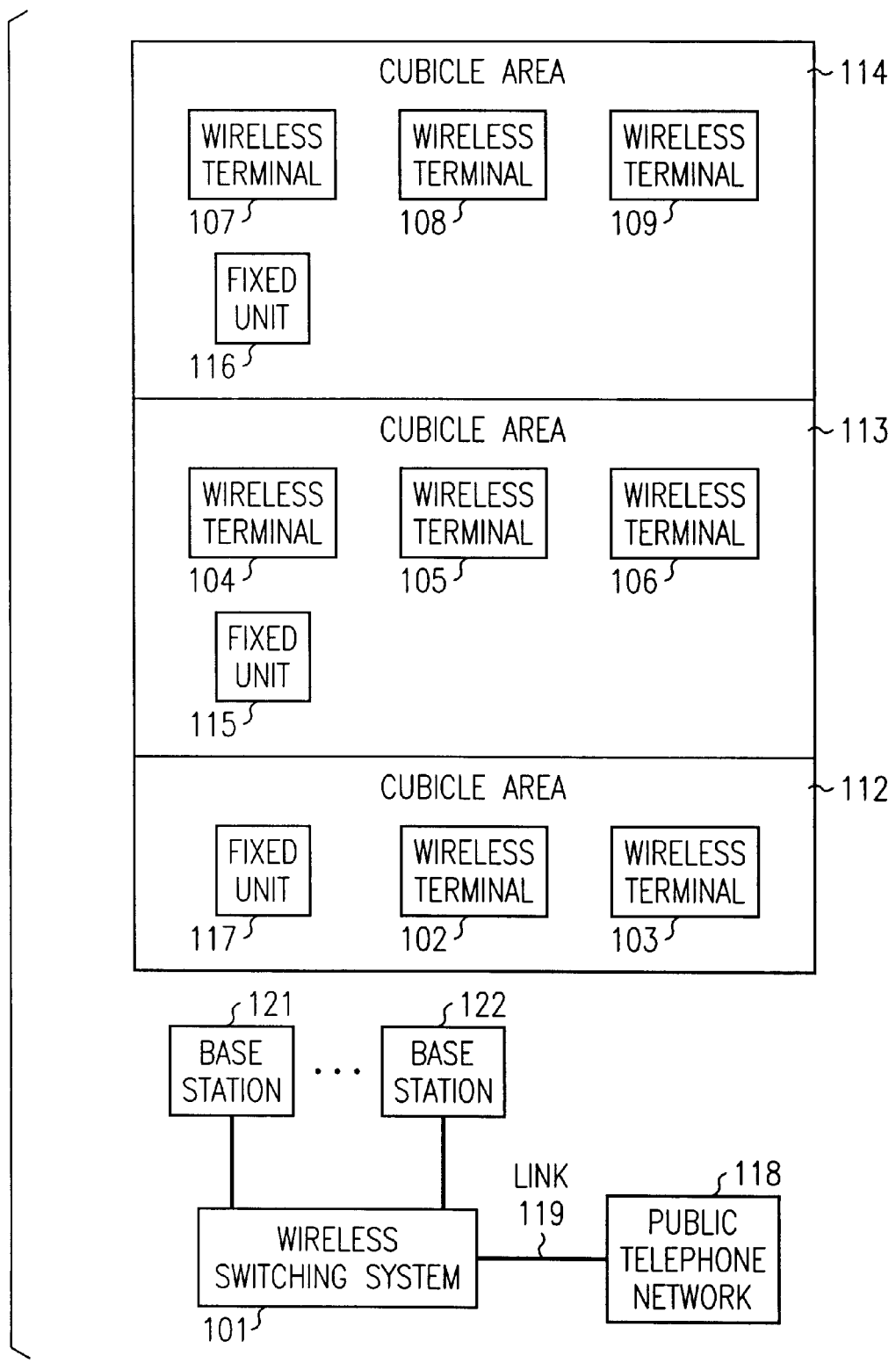
FIG. 1 is a block diagram of a wireless system for implementing the invention.

FIG. 1 illustrates, in block diagram form, a wireless system for implementing the invention. Wireless switching system 101 via base stations 121–122 provides wireless service for wireless terminals 102–109 that are free to roam throughout cubicle areas 112–114. Wireless terminals 102–109 determine which cubicle area they are in by receiving transmissions from the fixed unit located in each of these areas. Each fixed unit transmits at predefined intervals the identification of the fixed unit via a different transmission medium than utilized by the base stations 121–122. This transmission medium may be an infrared transmission. Wireless terminals 102–109 have a receiver for receiving the infrared transmission from the fixed units. When a wireless terminal receives the identification code from a fixed unit, the wireless terminal then utilizes the identification code to access an internal table to determine operations with respect to that fixed unit. FIGS. 2–7 illustrate Table 1 which is accessed with the identification of the fixed unit. One skilled in the art could readily see that other methods could be utilized to determine the location of a wireless terminal. For example, global positioning satellite (GPS) devices or base stations could be used to determine a position of a wireless terminal.

In accordance with the invention, it is possible to establish a terminating ring group based on the location of the wireless terminals. To understand this operation, consider the following example. A terminating ring group is established for cubicle areas 113 and 114 but not for cubicle area 112. In addition, as will be explained later in greater detail, it is possible for a wireless terminal to be marked in Table 1 indicating that when the wireless terminal enters a cubicle area having a terminating ring group that the marked wireless terminal will not become part of this group. At the start of the example, the wireless terminals are in the cubicle areas as illustrated in FIG. 1. FIGS. 2 and 3 illustrate Table 1 for wireless terminal 106, FIGS. 4 and 5 illustrate Table 1 for wireless terminal 104, and Tables 6 and 7 illustrate Table 1 for wireless terminal 108. FIGS. 2, 4, and 6 illustrate the contents of Table 1 for each of these wireless terminals when the wireless terminals are in the positions as illustrated in FIG. 1. In any given area, one wireless terminal is the controlling wireless terminal with respect to controlling the transfer of data between wireless terminals within that area. The controlling wireless terminal is determined by the wireless terminal in the area having the largest telephone number. One skilled in the art could readily envision that other algorithms could be utilized to determine the controlling wireless terminal.

For example, the controlling wireless terminal could be the terminal that had been in the area for the longest period of time. In addition, the controlling wireless terminal could be designated by a predefined priority scheme. For example, FIG. 2 illustrates that the controlling wireless terminal in cubicle area 113 is wireless terminal 106. This fact is indicated by a 1 in column 205 of FIG. 2 for wireless terminal 106. Also, FIG. 2 indicates that Table 1 is the table for wireless terminal 106 by the entry of a 1 in column 203 on the same line as the entry of wireless terminal 106 in column 201. Column 206 indicates with which fixed unit a wireless terminal is in communication. Further, each of the fixed unit has an assigned telephone number that is unique to the fixed unit and to which wireless terminals in communication with the fixed unit will respond unless a 1 is entered into column 204 indicating an excluded fixed unit. Note, that in FIG. 2, only fixed unit 117 is marked as being an excluded fixed unit. FIG. 4 illustrates Table 1 for wireless terminal 104 and indicates that the controlling wireless terminal is wireless terminal 106. Table 1 of FIG. 4 also indicates in column 403 of FIG. 4 that the telephone number for wireless terminal 104 is 2804. FIG. 6 illustrates Table 1 for wireless terminal 108 and defines that wireless terminal 109 is the controlling wireless terminal of the terminating ring group for fixed unit 116 located in cubicle area 114.

If an incoming call is received by wireless switching system 101 for wireless terminal 106, wireless switching system 101 broadcasts a page message specifying telephone number 2806. Wireless terminals 104 to 106 are responsive to this paging message to generate an alerting signal. This determination is made by examining column 202 of FIG. 2. Similarly, if wireless switching system 101 generates a page message for telephone number 2903 which is assigned to fixed unit 115, wireless terminals 104–106 each generate an alerting signal. The entries in Table 1 corresponding to the fixed units are preloaded into a wireless terminal via wireless switching system 101, manually loaded, or down loaded by attaching the wireless terminal to a computer not illustrated. The information in Table 1 pertaining to wireless terminals other than the information pertaining to the wireless terminal in the table of the storing wireless terminal is added or subtracted as a wireless terminal comes in contact with a fixed unit. When a wireless terminal loses contact with the fixed unit with which it is presently communicating, it transmits to the controlling wireless terminal the fact that it is no longer in contact with the fixed unit. The controlling wireless terminal then informs the other wireless terminals of the terminating ring group. If the departing wireless terminal is the controlling wireless terminal, it transmits to the wireless terminal having the next highest telephone number the fact that it has lost contact with the fixed unit. When a wireless terminal comes in contact with a new fixed unit, it transmits a transceiver alerting message directed to a reserved predefined telephone number. The controlling wireless terminal in the new terminating ring group responds to this message with a data call to the new wireless terminal and informs the new wireless terminal of the other wireless terminals in the terminating ring group. After the necessary information has been obtained from the new wireless terminal, the controlling wireless terminal transmits this information to the other wireless terminals in the terminating ring group. If the new wireless terminal has a higher priority than the current controlling wireless terminal, then the new wireless terminal becomes the controlling wireless terminal. If the transceiver alert message is not responded to by a controlling wireless terminal, the new wireless terminal assumes that it is the only wireless terminal in the terminating ring group for this fixed unit and designates itself as the controlling wireless terminal. As each wireless terminal in a terminating ring group receives information concerning a new wireless terminal from the controlling wireless terminal, each wireless terminal makes the necessary updates to its Table 1.

To further understand how Table 1 for each wireless terminal is modified by the addition or loss of a wireless terminal to a terminating ring group consider the following example. Wireless terminal 106 leaves area 113 losing contact with fixed unit 115 and moves to area 114 establishing contact with fixed unit 116. When wireless terminal 106 determined that it has lost contact with fixed unit 115, it established a data call to wireless terminal 105 and informed it that wireless terminal 105 is the new controlling wireless terminal for the terminating ring group for fixed unit 115. Wireless terminal 105 makes the necessary adjustments to its Table 1 and transmits the fact that wireless terminal 106 is no longer part of the group to wireless terminal 104. FIG. 5 indicates that wireless terminal 104 modifies Table 1 to delete reference to wireless terminal 106 and to indicate that wireless system 105 is the controlling wireless terminal by entry of a 1 in column 505 of FIG. 5. Note, if wireless terminal 106 is unable to establish a data call to wireless terminal 105, wireless terminal 105 realizes that wireless terminal 106 has departed from the terminating ring group when it does not receive a periodic data call from wireless terminal 106. The controlling wireless terminal periodically establishes data calls to the other wireless terminals of the terminating ring group so that these other wireless terminals can ascertain that the controlling wireless terminal is still present and so that the controlling wireless terminal can ascertain that the other wireless terminals are still present.

Continuing with the example, when wireless terminal 106 comes in contact with fixed unit 116, wireless terminal 106 transmits a transceiver alert message. Wireless terminal 109, the controlling wireless terminal for the terminating ring group for fixed unit 116, responds to this transceiver alert message in accordance with the protocol and establishes a data call to wireless terminal 106. Via the data call, wireless terminal 109 transmits to wireless terminal 106 the identities of wireless terminals 107 and 108. Wireless terminal 106 is responsive to this information to modify Table 1 as illustrated in FIG. 3. Wireless terminal 108 is responsive to the information from controlling wireless terminal 109 to add wireless terminal 106 to Table 1 for wireless terminal 108 as illustrated in FIG. 7 and to transmit this information to wireless terminals 107 and 108.

Figure 16:
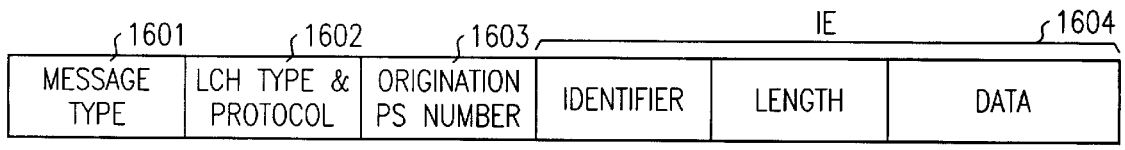
FIG. 16 illustrates the format of a transceiver alert message.

FIGS. 11–15 illustrate, in flow chart form, the steps performed by a wireless terminal. After being started, decision block 1101 determines if contact has been made with a new fixed unit. If the answer is yes, control is transferred to block 1100. In block 1100, the wireless terminal determines if on the previous fixed unit with which it was in communication whether or not it was part of a terminating ring group. If the wireless terminal was part of a terminating ring group, it informs the terminating ring group of its departure. Note, if the wireless terminal was not the controlling wireless terminal of the former terminating ring group, the departing wireless terminal simply transmits to the controlling wireless terminal the fact that it has departed from the terminating ring group. However, if the wireless terminal was the controlling wireless terminal of the terminating ring group from which it just departed, the wireless terminal informs the next highest priority wireless terminal of the terminating ring group of its departure. The next highest priority wireless terminal will then establish itself as the controlling wireless terminal of the former terminating ring group and inform the other wireless terminals of the departure. After execution of block 1100, control is transferred to block 1102. The wireless terminal establishes contacts with the present controlling wireless terminal by transmission of a transceiver alert message (illustrated in FIG. 16) in block 1102. The present controlling wireless terminal responds to this message with a disconnect and then transmits a data call to the present wireless terminal. After execution of block 1102, control is transferred to decision block 1103 which determines if the present wireless terminal is the new controlling wireless terminal. Note, that the transceiver alert message from the present controlling wireless terminal identified the telephone number of the present wireless terminal allowing the controlling wireless terminal to setup a data call. If no response is received to the transceiver alert message, the present wireless terminal executes block 1104. If the present wireless terminal is the new controlling wireless terminal, which means that it has a higher priority than the current controlling wireless terminal, control is transferred to block 1104 which informs the other wireless terminals in the terminating ring group that the present wireless terminal is now the controlling wireless terminal and obtains terminating ring group data. Then, block 1106 updates Table 1 of the present wireless terminal before returning control to decision block 1101.

If the present wireless terminal is not the new controlling wireless terminal, control is transferred from decision block 1103 to block 1107 which establishes contact with the controlling wireless terminal. Then, block 1108 receives the list and data of other wireless terminals in the terminating ring group from the controlling wireless terminal, and block 1109 updates Table 1 of the present wireless terminal before returning control to decision block 1101.

Figure 12:
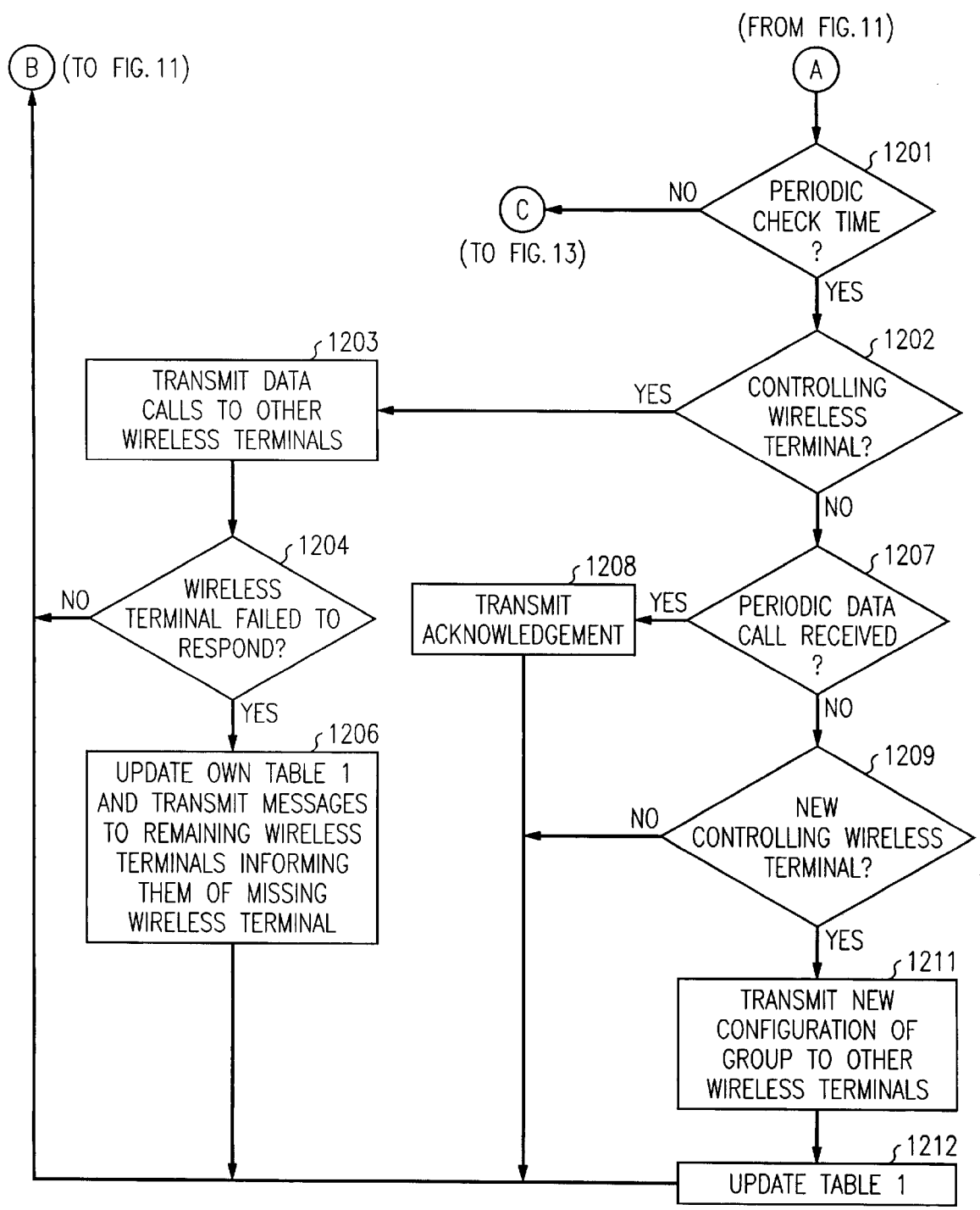

Returning to decision block 1101, if communication has not been established with a new fixed unit, control is transferred to decision block 1201 of FIG. 12. Decision block 1201 determines if the time has expired for the periodic check of the wireless terminals presently in a terminating ring group. If the answer is yes, control is transferred to decision block 1202 which determines if the present wireless terminal is a controlling wireless terminal in a terminating ring group. If the answer is yes in decision block 1202, block 1203 transmits data calls to each of the other wireless terminals in the terminating ring group. Decision block 1204 determines if any of these wireless terminals failed to respond to the data call. If the answer is no, control is transferred back to decision block 1101 of FIG. 11. If the answer is yes in decision block 1204, block 1206 updates the Table 1 of the present wireless terminals and transmits messages to the remaining wireless terminals in the terminating ring group informing them of the missing wireless terminal before transferring control back to decision block 1101 of FIG. 11.

If the answer in decision block 1202 is that the present wireless terminal is not the controlling wireless terminal of the terminating ring group, control is transferred to decision block 1207. The latter decision block determines if a periodic data call has been received. If the answer is yes, block 1208 transmits back an acknowledgment message before returning control to decision block 1101 of FIG. 11. If the answer in decision block 1207 is no, it indicates that the controlling wireless terminal has left the terminating ring group. Decision block 1209 determines if the present wireless terminal is the new controlling wireless terminal. If the answer is no, control is transferred back to decision block 1101 of FIG. 11. If the answer is yes, block 1211 transmits the new configuration of the terminating ring group to the other wireless terminals in the terminating ring group, and block 1212 updates Table 1 for the present wireless terminal before transferring control back to decision block 1101 of FIG. 11.

Figure 13:
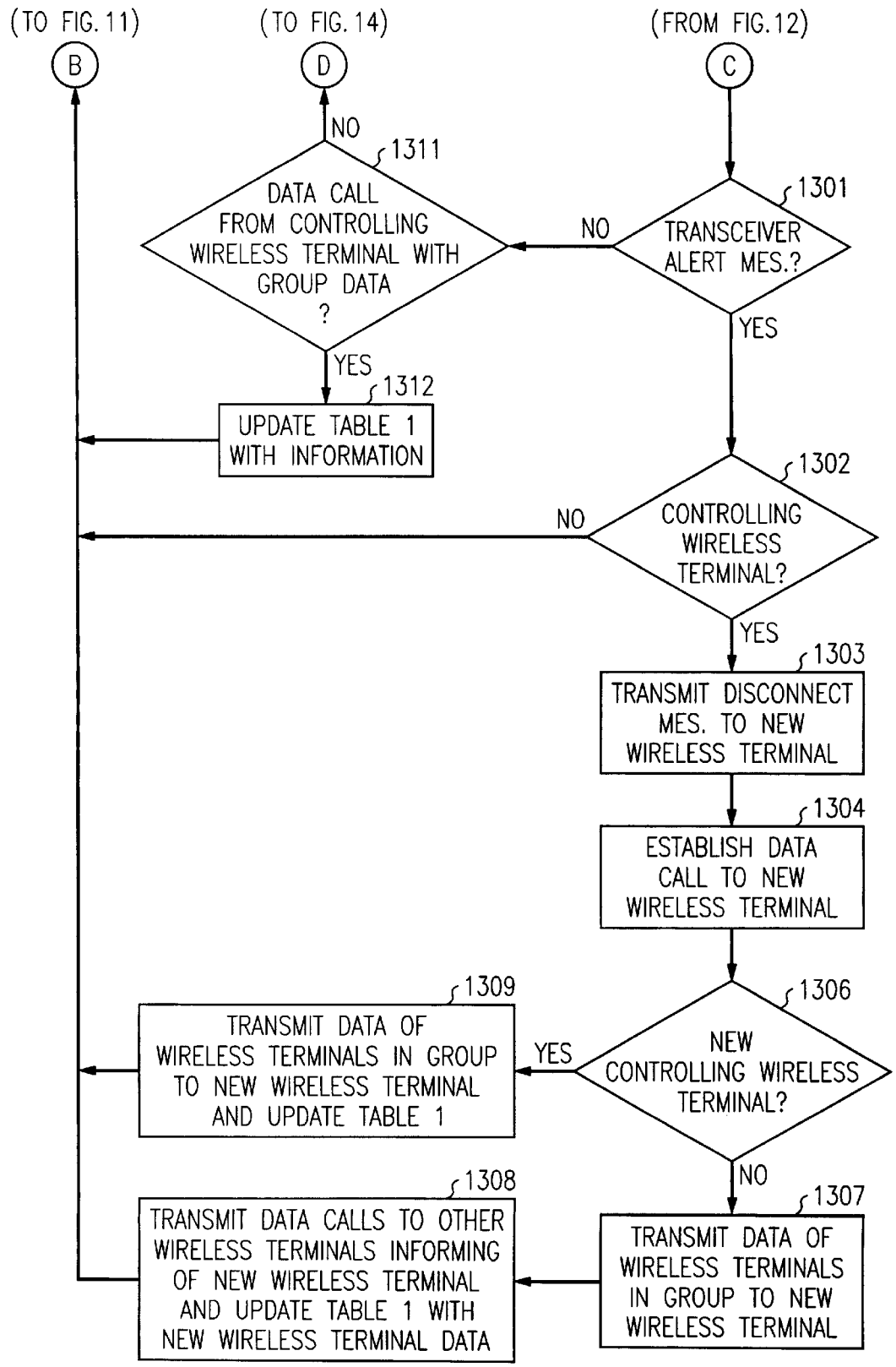
Figure 14:
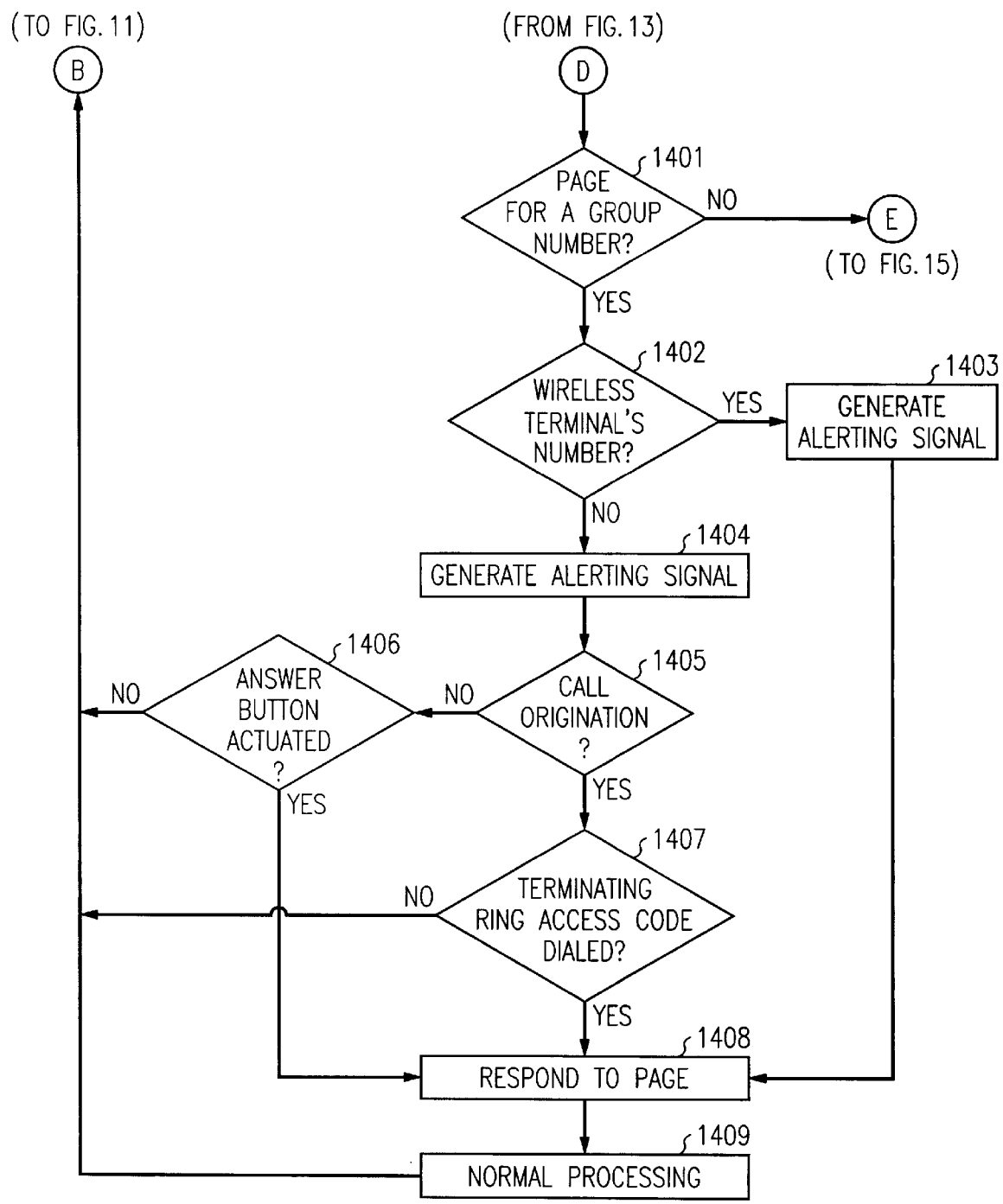
Figure 15:
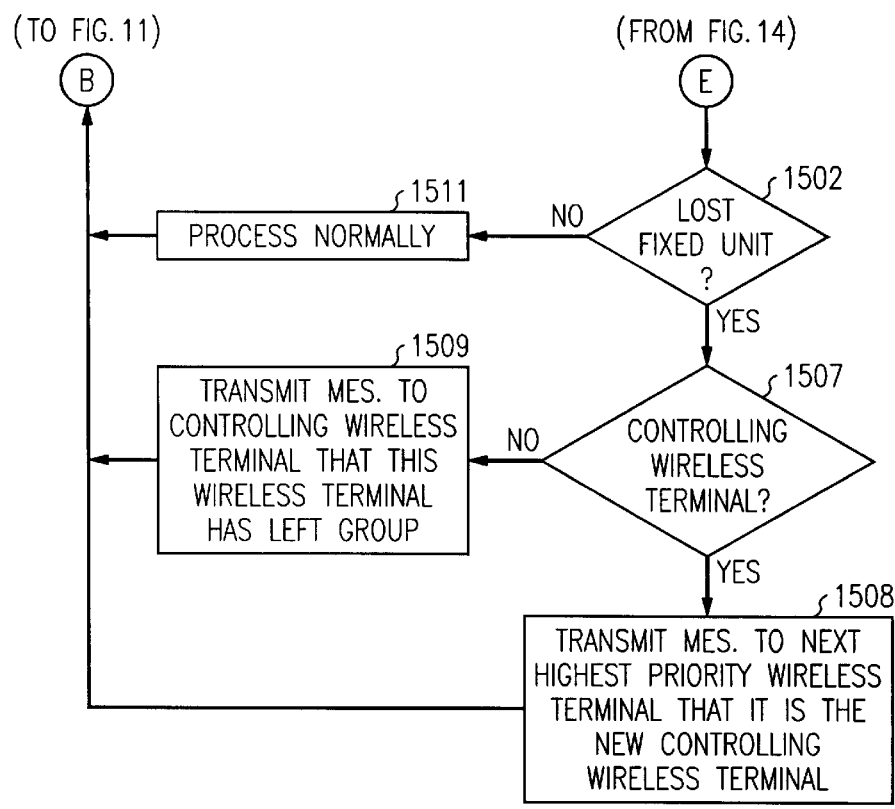

Returning to decision block 1201, if the answer is no, control is transferred to decision block 1301 of FIG. 13. Decision block 1301 determines if a transceiver alert message has been received from another wireless terminal. If the answer is yes, decision block 1302 determines if the present wireless terminal is the controlling wireless terminal for the terminating ring group. If the answer is no, the present wireless terminal makes no response to the transceiver alert message but transfers control back to decision block 1101 of FIG. 11. If the answer is yes in decision block 1302, block 1303 transmits a disconnect message to the new wireless terminal, and block 1304 establishes a data call to the new wireless terminal. Decision block 1306 determines if the new wireless terminal is to be the new controlling wireless terminal of the terminating ring group. If the answer is yes, block 1309 transmits the data of the wireless terminals in the terminating ring group to the new wireless terminal and updates Table 1 of the present wireless terminal to reflect the new controlling wireless terminal before transferring control back to decision block 1101 of FIG. 11. If the answer in decision block 1306 is no, block 1307 transmits the data of the wireless terminals in the terminating ring group to the new wireless terminal, and block 1308 transmits data calls to the other wireless terminals of the terminating ring group informing them of the data of the new wireless terminals and updates Table 1 of the present wireless terminal with the data of the new wireless terminal before transferring control back to decision block 1101 of FIG. 11.

Returning to decision block 1301, if the answer is no, control is transferred to decision block 1311. If a data call has been received from the controlling wireless terminal with terminating ring group data, the answer is yes in decision block 1311. If the answer is yes, block 1312 updates Table 1 of the present wireless terminal with the new terminating ring group data before returning control back to decision block 1101 of FIG. 11. If the answer is no in decision block 1311, control is transferred to decision block 1401 of FIG. 14.

Decision block 1401 determines if a page has been transmitted by wireless switching system 101 for a group terminating ring number. If the answer is yes in decision block 1401, decision block 1402 determines if the page contains the telephone number of the wireless terminal. This would mean that a call is being directed to the wireless terminal. If the answer is yes, block 1403 generates an alerting signal on the wireless terminal and transfers control to block 1408. Block 1408 responds to the page. Block 1409 then performs normal processing before transferring control back to block 1101 of FIG. 11. Part of the normal processing is to inform the other wireless terminals that the page has been answered. If the answer in decision block 1402 is no, block 1404 generates an alerting signal on the wireless terminal before transferring control to decision block 1405. The latter decision block determines if the wireless terminal has performed a call origination operation. If the answer is no, decision block 1406 determines if the answer button has been actuated. If the answer is yes in decision block 1406, control is transferred to block 1408 whose operations have already been described. If the answer is no in decision block 1406, control is transferred back to decision block 1101 of FIG. 11. If the answer in decision block 1405 is yes, decision block 1407 determines if the terminating ring (TR) access code has been dialed on the wireless terminal. If the answer is no, control is transferred back to decision block 1101 of FIG. 11. If the answer is yes in decision block 1407, control is transferred to block 1408 whose operations have been previously described.

Figure 9:
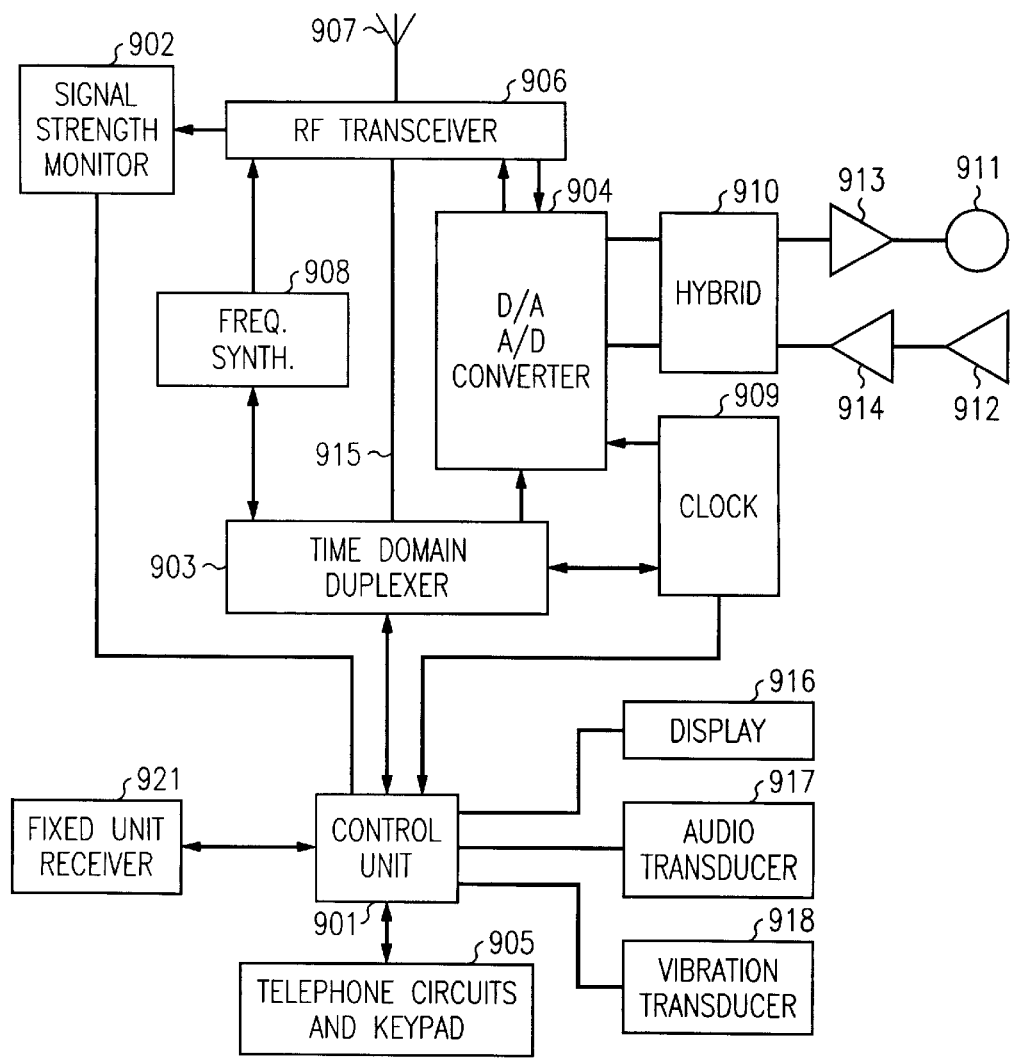
FIG. 9 illustrates, in block diagram form, a wireless terminal.

If the answer in decision block 1401 is no, decision block 1502 of FIG. 9 determines if communication has been lost with the fixed unit. If the answer is yes, control is transferred to decision block 1507. The latter decision block determines if the present wireless terminal is the controlling wireless terminal for the terminating ring group. If the answer is no, control is transferred to block 1509 which transmits a message to the controlling wireless terminal for the terminating ring group informing it that the present wireless terminal has left the terminating ring group. If the answer is yes in decision block 1507, block 1508 transmits a message to the next highest priority wireless terminal in the terminating ring group informing that wireless terminal that it is the new controlling wireless terminal. From either block 1508 or 1509, control is returned to decision block 1101 of FIG. 11. Returning to decision block 1502, if the answer is no, block 1511 performs normal processing before returning control back to decision block 1101 of FIG. 11.

Figure 8:
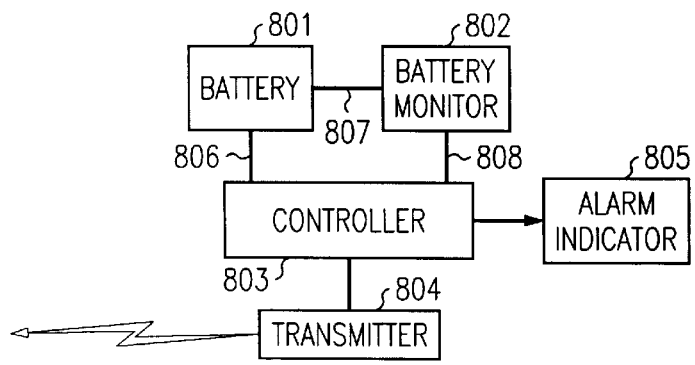
FIG. 8 illustrates, in block diagram form, a fixed unit.

FIG. 8 illustrates, in block diagram form, a fixed unit. The fixed unit of FIG. 8 is powered by battery 801. However, one skilled in the art could readily see that normal building AC power could also be utilized to power the fixed unit. Controller 803 periodically transmits the identification code for the fixed unit via transmitter 804. Advantageously, transmitter 804 can be transmitting utilizing infrared transmission or ultrasonic transmission. Transmitters for transmitting either infrared or ultrasonic are well known in the art. If controller 803 detects that battery 801 is at a low power level via conductor 807, battery monitor 802, and conductor 808, controller 803 sets alarm indicator 805 and transmits the low power indication along with the identification code via transmitter 804.

Wireless terminal 112 is illustrated in greater detail in FIG. 9. Wireless terminal 112 implements a wireless protocol that allows wireless terminal 112 to maintain a wireless signal link with wireless switching system 101 via base stations 121–122. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless terminal is provided by control unit 901. Units 902, 903, 906, 907, 908, and 909 provide the RF communication capabilities for the wireless terminal. Elements 904, 910, and 911–914 provide the audio information received and transmitted to the user; whereas, elements 916–918 and 905 provide the basic user interface. The PHS protocol allows control unit 901 to establish a logical data channel with wireless switching system 101. Control unit 901 utilizes this logical data channel to transmit identification information for fixed units to wireless switching system 101. Fixed unit receiver 921 receives the identification code of a fixed unit and transfers this identification code to control unit 901 for transmission to wireless switching system 101. Fixed unit receiver 921 is of a design well known in the art for either infrared or ultrasonic transmission media. One skilled in the art could readily see that fixed unit receiver 921 could provide to control unit 901 the signal strength of the received signal. Further, control unit 901 could also tune fixed unit receiver 921 to receive different frequencies or other variations of the transmission media using well known techniques in the art.

Figure 10:
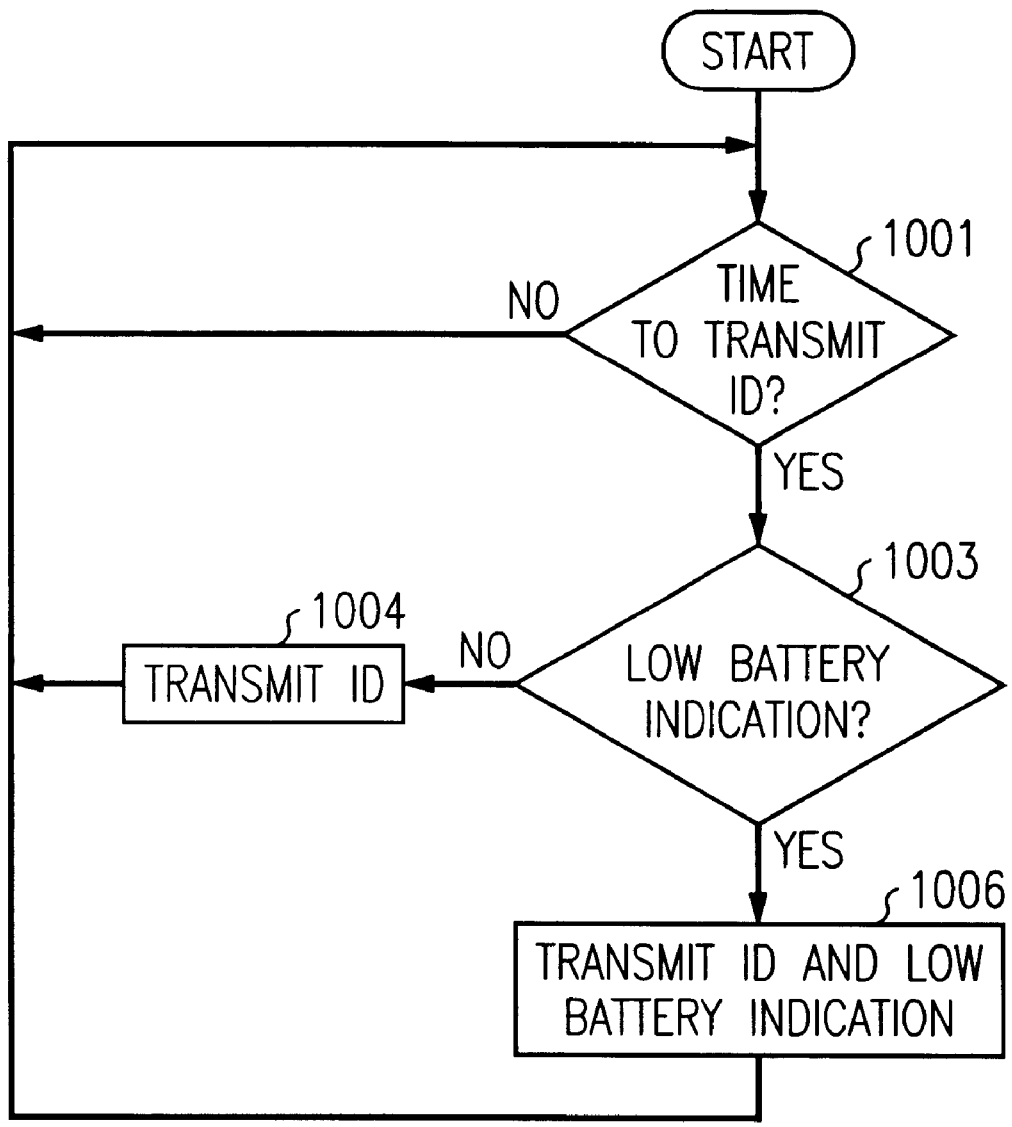
FIG. 10 illustrates, in flow chart form, steps performed by a fixed unit.
Figure 11:
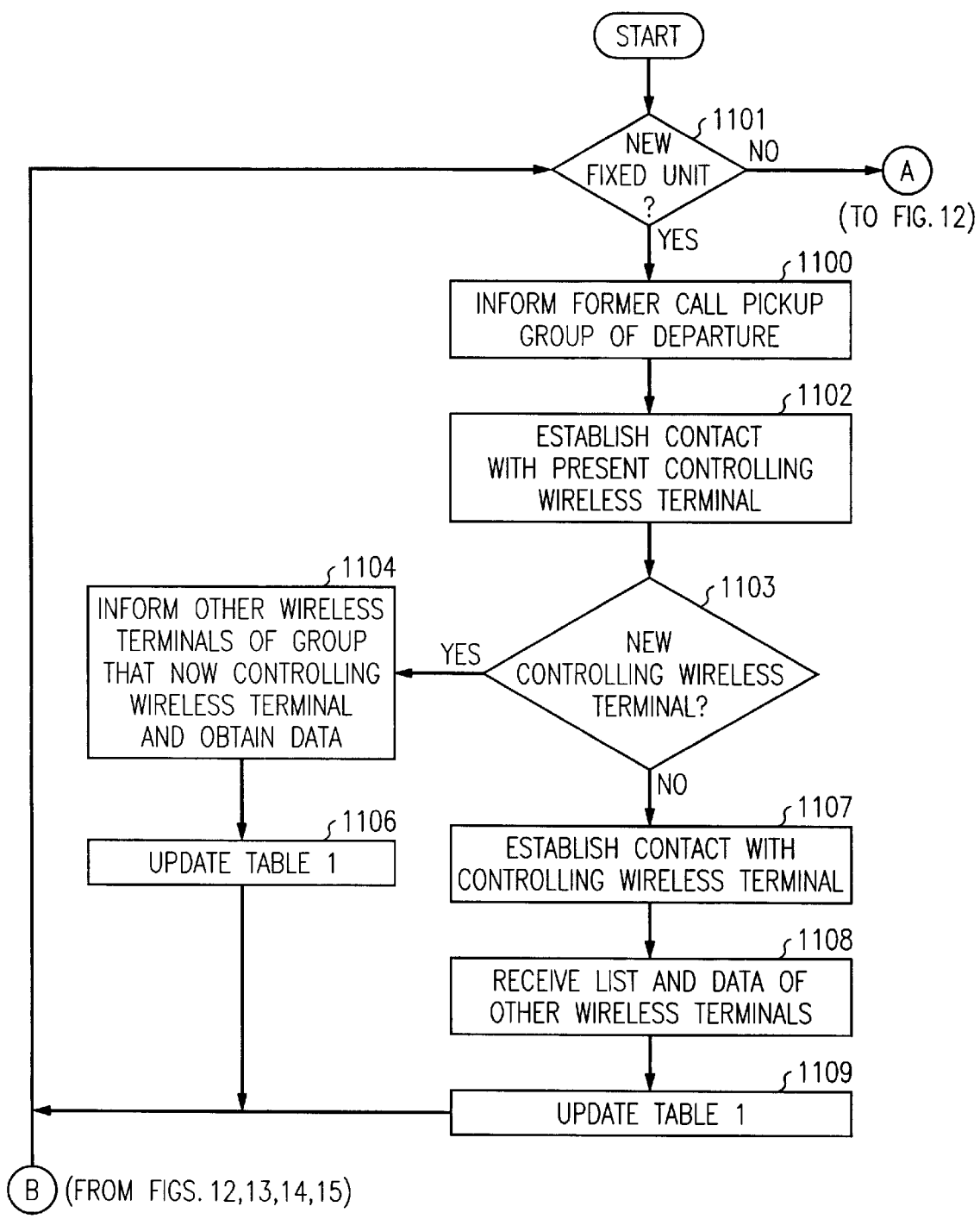
FIGS. 11–15 illustrate, in flow chart form, steps performed by a wireless terminal.

FIG. 10 illustrates the steps performed by a fixed unit. Decision block 1001 determines if it is time to transmit the identification code of the fixed unit. Advantageously, the identification code is transmitted every tenth of a second. If the answer is no, control is transferred back to decision block 1001. If the answer is yes, decision block 1003 determines if battery monitor 1002 of FIG. 10 is indicating a low battery. If the answer is no, block 1004 simply transmits the identification code of the fixed unit before transferring control back to decision block 1001. If the answer in decision block 1003 is yes, block 1006 transmits a message that includes the identification code and a low battery indication before transferring control back to decision block 1001.

Of course, various changes in modification to the illustrated embodiment described above will be apparent to those skilled in the art. These changes and modifications can be made without departing from the spirit and scope of the invention and without diminishing its intended advantages. It is therefore intended that such changes and modifications be covered by the following claims.

What is claimed is:

1. A method for establishing terminating ring groups in a wireless communication system having a wireless switching system, base stations and a plurality of wireless terminals, comprising the steps of:

determining that a one of the plurality of wireless terminals is in a one of a plurality of locations of the wireless communication system;

establishing inter-wireless terminal communication by the one of the plurality of wireless terminals with other ones of the plurality of wireless terminals in the one of the plurality of locations that are in a terminating ring group for the one of the plurality of locations in response to the determination that the one of the plurality of terminals is in the one of the plurality of locations; and joining the terminating ring group for the one of the plurality of locations by the one of the plurality of wireless terminals in response to the established communication.

2. The method of claim 1 wherein the step of joining comprises the step of receiving telephone numbers of the other ones of the plurality of wireless terminals in the terminating ring group by the one of the plurality of wireless terminals via the established communication.

3. The method of claim 2 further comprises the step of responding to telecommunication calls directed to the received telephone numbers of the other ones of the plurality of wireless terminals by the one of the plurality of wireless terminals.

4. The method of claim 3 wherein the one of the plurality of locations is assigned a telephone number and the method further comprises the step of responding to the assigned telephone number of the one of the plurality of locations by the one of the plurality of wireless terminals upon the one of the plurality of wireless terminals being in the one of the plurality of locations.

5. The method of claim 1 wherein the established inter-wireless terminal communication for the terminating ring group is controlled by a controlling one of the plurality of wireless terminals.

6. The method of claim 5 wherein the step of establishing comprises the step of contacting a controlling one of the plurality of wireless terminals by the one of the plurality of wireless terminals.

7. The method of claim 6 wherein the step of contacting comprises the step of transmitting a wireless terminal-to-wireless terminal message to the controlling one of the plurality of wireless terminals of the terminating ring group by the one of the plurality of wireless terminals.

8. The method of claim 7 wherein wireless terminal-to-wireless terminal message includes an identification of the one of the plurality of wireless terminals and the one of the plurality of locations.

9. The method of claim 7 wherein the step of contacting comprises the step of determining whether the one of the plurality of wireless terminal should replace the controlling one of the plurality of wireless terminals as a new controlling one of the plurality of wireless terminals.

10. The method of claim 9 wherein the controlling one of the plurality of wireless terminals for the terminating ring group is determined by a predefined algorithm.

11. The method of claim 5 further comprises the steps of leaving the one of the plurality of locations by the one of the plurality of wireless terminals; and transmitting in response to the leaving the one of the plurality of locations a message to the controlling one of the plurality of wireless terminals to inform the controlling one of the plurality of wireless terminals that the one of the plurality of wireless terminals is no longer in the terminating ring group.

12. The method of claim 11 further comprises the step of transmitting another message to each of the other ones of the plurality of wireless terminals that are in the terminating ring group to inform the other ones of the plurality of wireless terminals that the one of the plurality of wireless terminals is no longer in the terminating ring group.

13. The method of claim 5 further comprises the step of transmitting a periodic message by the controlling one of the plurality of wireless terminals to each one of the plurality of wireless terminal of the terminating ring group to determine the presence of each one of the plurality of wireless terminals in the terminating ring group.

14. The method of claim 3 wherein the step of determining comprises the steps of communicating with one of a plurality of fixed units each assigned to an individual one of the plurality of locations; and receiving the identity of the one of the plurality of fixed units.

15. An apparatus for performing the method of claim 1.
16. An apparatus for performing the method of claim 2.
17. An apparatus for performing the method of claim 11.
18. An apparatus for performing the method of claim 13.

* * * * *